(12) United States Patent
Bonjean et al.

(10) Patent No.: US 9,320,285 B2
(45) Date of Patent: Apr. 26, 2016

(54) METHOD FOR PREPARING READY-TO-BAKE FROZEN DOUGHS

(75) Inventors: Bernard Bonjean, Marbais (BE); Stefan Cappelle, Onkerzele (BE); Martin De Poorter, Buggenhout (BE); Peter Deriemaeker, Maarkedal (BE)

(73) Assignee: Puratos N.V., Groot-Bijgaarden (BE)

( * ) Notice: Subject to any disclaimer, the term of this patent is extended or adjusted under 35 U.S.C. 154(b) by 106 days.

(21) Appl. No.: 12/988,966

(22) PCT Filed: Apr. 21, 2009

(86) PCT No.: PCT/EP2009/054743
§ 371 (c)(1),
(2), (4) Date: Oct. 21, 2010

(87) PCT Pub. No.: WO2009/130219
PCT Pub. Date: Oct. 29, 2009

(65) Prior Publication Data
US 2011/0033574 A1    Feb. 10, 2011

(30) Foreign Application Priority Data

Apr. 22, 2008    (EP) .................... 08154965

(51) Int. Cl.
*A21D 8/00* (2006.01)
*A21D 10/02* (2006.01)
*A21D 8/04* (2006.01)

(52) U.S. Cl.
CPC ............... *A21D 10/02* (2013.01); *A21D 8/047* (2013.01)

(58) Field of Classification Search
CPC ........................... A21D 6/001; A21D 8/047
USPC .................................. 426/19, 20, 62
See application file for complete search history.

(56) References Cited

U.S. PATENT DOCUMENTS

| | | | |
|---|---|---|---|
| 4,450,177 A * | 5/1984 | Larson et al. ................... 426/19 |
| 4,764,472 A | 8/1988 | Pomper et al. | |
| 4,847,104 A | 7/1989 | Benjamin et al. | |
| 5,804,233 A * | 9/1998 | Lonergan et al. ............... 426/19 |
| 6,372,481 B1 | 4/2002 | Wada et al. | |
| 6,500,475 B1 * | 12/2002 | Kraklow et al. ................ 426/94 |
| 2006/0233935 A1 | 10/2006 | Van Haesendonck | |
| 2007/0218167 A1 | 9/2007 | Bhatia | |

FOREIGN PATENT DOCUMENTS

| | | |
|---|---|---|
| JP | 01091741 | 11/1989 |
| WO | 2005077194 | 8/2005 |

OTHER PUBLICATIONS

The Good Housekeeping Step-by-Step Cookbook, p. 417, 1997.*

* cited by examiner

*Primary Examiner* — Lien T Tran
(74) *Attorney, Agent, or Firm* — Ann R. Pokalsky; Dilworth & Barrese, LLP

(57) ABSTRACT

The present invention relates to a new method for preparing fully fermented frozen dough, formulation of the ingredients and process to produce different type of bakery product. The fully fermented frozen doughs obtained using this method do not require the addition of additives and allow baking of the fermented frozen dough without any additional proofing step thereby providing high quality bakery products.

14 Claims, No Drawings

METHOD FOR PREPARING READY-TO-BAKE FROZEN DOUGHS

CROSS REFERENCE TO RELATED APPLICATIONS

This application is a 371 of International Application No. PCT/EP2009/054743 filed Apr. 21, 2009.

FIELD OF THE INVENTION

The present invention relates to methods for producing fully fermented frozen doughs using instant active dry yeast. The fully fermented frozen doughs obtained using this method do not require the addition of any additives and allow baking off the fermented frozen dough without an additional proofing step thereby providing high quality bakery products.

BACKGROUND OF THE INVENTION

The traditional process for producing bakery product includes mixing of ingredients, kneading of dough, dividing the dough into smaller portions, shaping and molding of dough pieces, proofing it to a particular volume, and baking. This process is cumbersome, time-consuming, and requires appropriate equipments and qualified bakers for manufacturing for instance a bread with organoleptic characteristics that are typical of freshly-baked bread. In order to minimize preparation time and still provide freshly-baked bread, frozen dough products have gained popularity in food-service, in-store bakeries, as well as home-baking.

Depending on the method of production, frozen doughs are available in different forms. Pre-fermented frozen doughs are proofed before freezing whereas un-proofed or partially proofed frozen doughs require proofing before baking off. Fully fermented frozen doughs (FFF) are fully pre-proofed and do not require proofing before baking off, meaning the production facility would advantageously blend materials and/or ingredients, mix, shape, and fully proof the dough prior to freezing. The receiver of these FFF doughs would then remove the dough from the freezer, place them onto trays and bake them in an oven.

However, the baking potential of frozen doughs decreases with increasing frozen storage time or the number of freeze-thaw cycles. Furthermore, frozen doughs are associated with a deterioration of the organoleptic characteristics of the doughs and the bakery products obtained after baking.

The loss of quality and baking potential can be limited by adjustments in processing conditions, formulation, type of yeast, type of flour and by using additives. Therefore, the frozen doughs described in literature typically involve higher than conventional yeast dosage and/or flour rich in proteins, and/or addition of gluten and/or addition of additives such as mono- & diglycerides, gums, dextrose, fat, chemical leavening agents, ethanol, ADA, etc. All these ingredients are added at concentrations higher than usually used by a person skilled in the art. Furthermore, the use of high amount of yeast together with special flours and additives is economically not viable for a producer.

The methods that require additives involve a process without any fermentation steps prior to freezing or they require a complete thawing phase at controlled temperature before baking. This thawing phase actually corresponds to a proofing step and therefore such a dough product can be considered to be a ready-to-proof product. When a post-thawing proofing step is included in the process the use of dry yeast is not advised.

Typically, it is well know in the bakery sector and by any person skilled in the art that the best quality results are obtained using the freshest yeast available such as for instance liquid yeast or compressed yeast. Some producers develop also new type of yeasts that are suitable for usage in frozen applications, such as "frozen yeast" or "freeze tolerant yeast". Instant yeast is rarely used in frozen doughs, because it is known to be sensitive to cold shock. Furthermore, frozen doughs require twice the amount of yeast than regular doughs.

Additionally, the market requests more and more to develop recipes with only a small amount or even no incorporation of additives.

The present invention aims at providing new methods for obtaining fully fermented frozen doughs as well as doughs and bread products obtained with such doughs that do not require any additives and allow baking off the fully fermented frozen dough without an additional proofing step.

SUMMARY OF THE INVENTION

The present invention provides a method for obtaining fully fermented frozen doughs without the addition of any additives. It was surprisingly found that it is possible to prepare fully fermented frozen doughs which are ready-to-bake, using a dry leavening agent such as instant active dry yeast at low concentrations or an active bakery component comprising IADY as described in WO2006/000065A1. The fully fermented frozen dough can be baked off with outstanding volume and oven development, comparable to direct baked product produced without intermediate freezing period.

The present invention therefore provides a method for producing a fully fermented frozen dough, comprising the steps of:
(a) preparing a dough by mixing at least flour, water and a IADY;
(b) kneading and moulding the dough;
(c) proofing the dough until complete proofing has been achieved; and,
(d) freezing the dough.

The instant active dry yeast is added to the mix without prior processing and preferably in an amount between 0.5 to 2 wt %, based on the flour.

More preferably, the method of the present invention can further comprise steps where the fully fermented frozen dough is thawed and baked. Additionally, the method can further comprise a step where the fully fermented frozen dough is incised at its top surface prior to baking.

In a preferred embodiment the method of the present invention further comprises a flattening step after proofing and prior to freezing. During this flattening process the dough is rolled out or compressed before freezing, as such reducing the thickness of the dough product. This step optimises the storage of the dough pieces.

The present invention further relates to fully fermented frozen doughs and bread products obtained by the method of the present invention.

DETAILED DESCRIPTION OF THE INVENTION

The present invention relates to fully fermented frozen (FFF) doughs and methods for manufacturing the same. After freezing, the present method enables baking off the fully fermented frozen dough without passing trough a proofing step. A critical aspect of the method of manufacturing the product is the use of a low amount of instant active dry yeast (IADY). It has surprisingly been found that when using low amounts of IADY, a fully fermented frozen dough can be obtained. When baked off, a bakery product can be obtained that is characterized by an outstanding volume and oven development. These characteristics are comparable to direct baked products produced without an intermediate freezing period. Since no proofing is required after freezing, the present invention reduces the time required to obtain freshly baked bakery products from a frozen dough. Furthermore, it is not required to invest in expensive proofing boxes for a post-freezing and/or thawing final proof, this while still producing freshly baked bakery products with outstanding quality comparable to the one obtained without the intermediate freezing step.

The process of the invention comprises a dough preparation following the rules of the standard baking process but using a specific type of leavening agent namely Instant Active Dry Yeast (IADY) or a dry bakery component comprising IADY and based on sourdough and standard ingredients in bread making such as but not limited to flour, salt, sugar, fat, ascorbic acid, etc. The fully fermented frozen doughs can be obtained without the addition of additives. Therefore, the method according to the invention will result in improved bakery products.

In the present invention the term "bakery product" refers to any type of bakery products known in the art, such as for instance selected from the group comprising bread, soft rolls, bagels, donuts, Danish pastry, hamburger rolls, pizza, pita bread, ciabatta, cake and other baked products where initial hardness is a quality issue, preferably bread. Next to the soft product range there is also the range of crusty products like baguettes, rolls, crackers, biscuits, cookies, pie crusts, rusks and the like. More preferably the present invention refers to any types of bread products known in the art.

In the present invention the term "fully fermented frozen" or "FFF" doughs refer to bakery products which are fully pre-proofed. These products are mixed, shaped, and fully proofed prior to freezing. The receiver of these FFF doughs needs to remove the doughs from the freezer, place them onto trays and bake them in an oven.

In the present invention the term "instant active dry yeast" or IADY refers to a dry yeast product that does not require mildly warm liquid to be activated. This type of yeast is obtained through a specific process that controls the final product dry matter. IADY is also more finely granulated than active dry yeast, so it does not need to be dissolved in water first. It can be added directly to the dry ingredients. On the contrary the use of active dry yeast requires a hydration step in water before adding the yeast product to the dough. This step is also referred to as "rehydratation".

In the present invention the term "fresh yeast" refers to a baker's yeast having a dry matter of about 27-35%, the term "active dry yeast" or "ADY" refers to a baker's yeast having a dry matter of about 92-94% and the term "instant active dry yeast" or "IADY" refers to a baker's yeast having a dry matter of about 94-97%.

In the present invention the term "proofing" refers to a stage in the rising of the dough. After its first rise, the dough is punched down and shaped in its final form. It is then set out for its final rise, known as "proofing".

In the present invention the term "flattening" refers to a process step where the dough is rolled out or compressed, as such reducing the thickness of the dough product. Since the thickness of the dough is reduced by the flattening, this process step enables to optimise the storage of the dough pieces.

In the present invention the term "active bakery component based on sourdough", as described in WO2006/000065A1 (incorporated herein as reference), refers to a product in powder, said product containing Instant Active Dry Yeast as leavening agent. Following the instruction of the supplier, the quantity used in the dough is equivalent to 0.6-2.2% IADY based on flour weight in the recipe. An example of "active bakery component based on sourdough" is the product O-tentic sold by the company Puratos (Belgium).

In the present invention the term "flavour improver" refers to a "flavour improvement system" or a "bread flavour improvement system" or a "bread flavour improvement composition". All these terms refer to a sourdough or a sourdough product; a bakery sponge or a sponge product; or another bread flavour improvement composition (see below). By a "sourdough" is meant a dough fermented by lactic acid bacteria and eventually yeast, having a characteristic acidic flavour due to the lactic acid bacteria producing mainly lactic acid, acetic acid and some minor compounds and eventually the typical flavour top-notes produced by the yeast. A "sourdough product" in the present context refers to the product above, that is stabilized in one or another way (e.g. through drying, pasteurization, cooling, freezing, . . . ) so that this product can be added to a regular dough, thereby replacing the in-bakery produced pre-fermentation. By a "sponge" or "sponge dough" is meant a dough fermented by yeast, having a characteristic flavour due to said yeast fermentation. It is a pre-fermentation product based on a yeast fermentation of part of the flour. A "sponge product" refers to the stabilized form of such a regular bakery sponge fermentation, used to enhance the flavour in a regular dough. It can be a sponge extract. "Other flavour improver compositions" or "other bread flavour improver compositions" can be blends of chemical aroma compounds and/or acids and/or acidifying agents (producing acid and/or gas).

In the present invention the term "improver composition" refers to a composition that may comprise chemical additives as well as enzymes, which are added to the dough in order to improve dough handling properties and/or quality of the final baked product.

In a first embodiment of the present invention a method for producing a fully fermented frozen dough is provided, comprising the steps of:
(a) preparing a dough by mixing at least flour, water and IADY or an active bakery component comprising IADY;
(b) kneading and moulding the dough;
(c) proofing the dough until complete proofing has been achieved; and,
(d) freezing the dough.

In another embodiment of the present invention a method for producing a fully fermented frozen dough is provided, consisting of the steps of:
(a) preparing a dough by mixing at least flour, water and IADY or an active bakery component comprising IADY;
(b) kneading and moulding the dough;
(c) proofing the dough until complete proofing has been achieved; and,
(d) freezing the dough.

The dough can be frozen by methods known in the art such as but not limited to blast freezing. When freezing the dough, a uniform cooling rate is desirable. For prolonged stability, the frozen dough is preferably stored at a temperature lower than $-5°$ C., preferably between $-10°$ C. and $-25°$ C. and most preferably between $-15°$ C. and $-20°$ C. In the frozen state the dough pieces are stored for a desired period of time. During this storage period the quality of the dough is not affected.

The dry leavening agent used in the preparation of the dough can either be IADY and/or an active bakery compound based on sourdough and comprising IADY as described in WO2006/000065A1.

In a preferred embodiment of the present invention the dry leavening agent, preferably IADY, is used in a concentration between 0.5 and 2% based on the flour weight and for instance the Instant Active Dry Yeast is used at a concentration of 0.5%, 0.6%, 0.7%, 0.8%, 0.9%, 1.0%, 1.1%, 1.2%, 1.3%, 1.4%, 1.5%, 1.6%, 1.7%, 1.8%, 1.9% or 2.0% based on the flour weight.

In a preferred embodiment of the present invention the Instant Active Dry Yeast is used at a concentration between 0.5 and 2% based on the flour weight and for instance the dry leavening agent, when expressed as equivalent Instant Active Dry Yeast, is used at a concentration of 0.5%, 0.6%, 0.7%, 0.8%, 0.9%, 1.0%, 1.1%, 1.2%, 1.3%, 1.4%, 1.5%, 1.6%, 1.7%, 1.8%, 1.9% or 2.0% based on the flour weight.

In another preferred embodiment of the present invention the dry leavening agent, preferably IADY or an active bakery component comprising IADY is added in the preparation of the dough without prior processing.

Additionally a flattening process step can be included in the method of the present invention. During this flattening process the dough is rolled out or compressed preferably after proofing and prior to freezing, as such reducing the thickness of the dough product. Since the thickness of the dough is reduced by the flattening, the storage of the FFF dough pieces can be optimised. The present invention gives as such the opportunity for the producers of bread to gain space in the storage of the goods due to the reduced thickness of the dough after flattening. It was surprisingly found that the flattening of the dough prior to freezing does not alter the properties of the bakery product after baking. These characteristics of the flattened FFF dough and the bakery products obtained after baking off this dough are surprisingly comparable to direct baked products produced without an intermediate freezing period and eventually a flattening step prior to freezing.

In a preferred embodiment, the method of the present invention further comprises a flattening step after proofing and prior to freezing.

The method according to the invention consists optionally of flattening the fermented dough in order to decrease the thickness of the dough and to freeze these flattened pieces of dough in order to keep the dough in a freezer for a defined period of time.

Additionally, a flavour improvement composition and/or (a) flavour improvement compound(s) and/or salt can be used in the preparation of the dough. The flavour improvement compounds can be chosen from the group comprising natural aroma compounds, chemical aroma compounds, acids, acidifying agents or a mixture of two or more thereof. The flavour improvement composition preferably comprises or consists of a sourdough, a sourdough product, a bakery sponge, a sponge product, or a mixture of two or more thereof.

In a preferred embodiment the fully fermented frozen dough of the present invention additionally contains a flavour improvement composition comprising or consisting of a sourdough, a sourdough product, a bakery sponge, a sponge product, or a mixture of two or more thereof.

The flavour improvement compounds used in the bakery process of the invention, can comprise or consist of one or more natural aroma compounds, one or more chemical aroma compounds, one or more acids and/or one or more acidifying agents (producing acid and/or gas), or a mixture of two or more thereof.

In another preferred embodiment the fully fermented frozen dough of the present invention further comprises one or more flavour improvement compounds selected from the group comprising natural aroma compounds, chemical aroma compounds, acids, acidifying agents or a mixture of two or more thereof.

Additionally, an improver composition can be used in the preparation of the dough. The improver composition can comprise or consist of:
- one or more enzymes selected from the group comprising or consisting of but not limited to amylases, xylanases, lipases, oxidases, lipoxygenases, proteases, dehydrogenases and laccases, and/or
- one or more oxidizing or reducing agents, such as but not limited to ascorbic acid, glutathione, cysteine, and/or
- one or more emulsifiers, such as but not limited to DATEM®, SSL®, CSL®, GMS®, rhamnolipids, lecithines, sucroesters, bile salts, and/or
- one or more fatty materials, such as but not limited to margarine, butter, oil, shortening and/or
- one or more vitamins, such as but not limited to pantothenic acid, vitamin E, and/or
- one or more gums and/or
- one or more sources of fiber, such as but not limited to oat fiber.

The improver composition may also consist of a mixture of two or more of the listed components.

In a preferred embodiment the fully fermented frozen dough of the present invention additionally contains an improver composition comprising:
- one or more enzymes selected from the group consisting of amylases, xylanases, lipases, oxidases, lipoxigenases and proteases, and/or
- one or more oxidizing or reducing agents, and/or
- one or more emulsifiers, and/or
- one or more fatty materials, and/or
- one or more vitamins, and/or
- one or more gums, and/or
- one or more sources of fibre, or
- a mixture of two or more thereof.

The method according to the invention consists also in the baking of the frozen pieces of dough in order to produce a baked product with highest quality in terms of aspect and taste.

According to a preferred embodiment of the invention the frozen doughs are baked directly after thawing the dough. In another preferred embodiment the frozen dough is partially thawed prior to baking. With "partially thawed" is meant that the fully fermented frozen dough is thawed until the temperature of the surface of the dough product is at least 1° C.

In another embodiment, the method of the present invention comprises the steps of thawing and baking the fully fermented frozen dough.

This thawing step cannot be regarded as a proofing step since the dough does not rise during the thawing.

The method according to the invention is particularly suitable for the preparation of fully fermented doughs that can be baked to obtain any non-laminated bakery product. In a preferred embodiment the doughs are baked to obtain bakery products with one or more incisions on the surface.

In yet another embodiment, the method of the present invention, further comprises the step of incising the fully fermented frozen dough at its top surface prior to baking.

By making incisions in the dough, cuts are obtained in the bakery product obtained after baking. In particular the widths of the cuts at the surface of the bakery product are similar to those obtained when baking breads starting from fresh doughs without a freezing step.

The present invention further relates to fully fermented frozen doughs obtained by the method of the present invention.

The present invention also relates to bread products obtained by the method of the present invention.

The present invention further relates to incised bread products obtained by the method of the present invention.

In a preferred embodiment of the present invention a method for producing a bakery product and preferably a bread product is provided, comprising the steps of:
(a) preparing a dough by mixing at least flour, water and a dry leavening agent;
(b) kneading and moulding the dough;
(c) proofing the dough until complete proofing has been achieved;
(d) optionally flatten the dough;
(e) freezing the dough;
(f) optionally thaw the dough; and,
(g) baking the dough, thereby obtaining said bread product.

EXAMPLES

Example 1

Partially Proofed Frozen Doughs

Doughs are made with flour, salt, leavening agent, improver and water. The proportions of the different components used in the process are summarised in Table 1. The improver contains emulsifier, gluten, ascorbic acid and enzymes. A first composition (test 1) contains fresh yeast as leavening agent whereas a second composition (test 2) contains IADY as leavening agent.

TABLE 1

| Component | Test 1 Grams | Test 2 Grams |
|---|---|---|
| Flour (Paniflower, Brabomills, Belgium) | 5000 | 5000 |
| Salt | 100 | 100 |
| Fresh yeast (Levante, Puratos, Belgium) | 300 | 0 |
| Instant Active Dry Yeast (Okedo, Puratos, Belgium) | 0 | 100 |
| Improver (S Kimo long, Puratos, Belgium) | 200 | 200 |
| Water | 2950 | 2750 |

The process method is described in Table 2.

TABLE 2

| | Method |
|---|---|
| Kneading | 2 minutes at low speed with 90% of the water<br>5 minutes at high speed<br>2 minutes at high speed after addition of the 10% remaining water |
| Dough temperature | 20° C. |
| Bulkproof | 5 minutes |
| Scaling | Bread 150 g |
| Forming | Molding |
| Blast freezing | 45 minutes at −30° C. |
| Storage | −18° C. |

The different doughs are prepared following the method described in table 2 and using different ingredients described in table 1. After a defined freezing period, bakery products are taken out of the freezer and treated following the process described in Table 3.

TABLE 3

| | Method |
|---|---|
| Defrost | 60 minutes at room temperature (25° C.) |
| Final fermentation | 70 minutes/35° C./95% Relative Humidity |
| Oven pre steaming | 3 seconds |
| Baking in rotating oven | 20 minutes 230-200° C./steam 15 seconds |

The results of the comparative tests are summarized in Table 4 and 5.

TABLE 4

| Storage period | | Test 1 | Test 2 |
|---|---|---|---|
| 7 days | Volume (%) | 100 | 60 |

"Volume" refers to the volume of the products in % considering the bread made with fresh yeast as reference. Each data is the average of 6 measurements.

TABLE 5

| Storage period | | Test 1 | Test 2 |
|---|---|---|---|
| 7 days | Height (cm) | 7.4 | 4.2 |

"Height" refers to the height of the breads in cm. Each data is the average of 6 measurements.

These results show that fresh yeast is advantageously used for preparing partially proofed bread doughs compared to instant active dry yeast. The volume and height of the breads obtained from partially proofed frozen doughs is larger for the bread where fresh yeast is used in the dough. The use of IADY in partially proofed frozen doughs clearly has a inferior effect on the quality of the final bread product.

Example 2

Fully Fermented Frozen Doughs

A dough is made with flour, salt, leavening agent and water. The proportions of the different components used in the process are summarised in Table 6.

TABLE 6

| Component | Grams |
|---|---|
| Flour (DUO, Céres, Belgium) | 5000 |
| Salt | 100 |
| O-tentic (Puratos, Belgium) | 200 |
| Water | 3400 |

O-Tentic is an "active bakery component based on sourdough" that contains Instant Active Dry Yeast, sourdough, enzymes and ascorbic acid. Final IADY concentration in the dough is 8 g/1 kg flour.

The process method is described in Table 7.

TABLE 7

| | Method |
|---|---|
| Kneading | 6 minutes at low speed with 90% of the water<br>4 minutes at high speed<br>2 minutes at high speed after addition of the 10% remaining water |

TABLE 7-continued

| | Method |
|---|---|
| Dough temperature | 30° C. |
| Bulkproof | 30 minutes |
| Scaling | Baguettes 375 grams |
| Forming | Rounding and preshaping (stretching) |
| Intermediate fermentation | 20 minutes |
| Moulding | Putting tension inside dough |
| Final fermentation | 50 minutes at 28° C. |
| Flattening | Front (v) 4.9 cm~Back (a) 3.25 cm |
| Blast freezing | 45 minutes at −30° C. |

Different doughs are prepared following the method described in table 2 and using different ingredients. The comparative processing steps are summarized in Table 8.

TABLE 8

| Test n° | processing steps |
|---|---|
| 1 | direct freezing |
| 2 | freezing after flattening step |

Flattening is made by passing the dough through a croissant dough laminating machine. Height of the doughs is reduced by about 50%.

After a defined freezing period, doughs are taken out of the freezer and treated following the process described in Table 9.

TABLE 9

| | Method |
|---|---|
| Partial surface thawing | 30 minutes at room temperature |
| Cutting | 6 cuts a bread |
| Oven pre steaming | 3 seconds |
| Baking | 2 minutes 230° C./steam 1 second |
| | 19 minutes 200° C. |
| | 5 minutes 200° C. key opened |

The results of the comparative tests are summarized in Tables 10a and 10b.

TABLE 10a

| | | Test n° | |
|---|---|---|---|
| Storage period | | 1 | 2 |
| Day 0 | Cuts opening | 39 | 38 |
| 7 days | Cuts opening | 37 | 37 |
| 90 days | Cuts opening | 33 | 31 |

"Cuts opening" refers to the width of the cuts in mm as measured on the upper crust of baguette. Each measurement is an average of the 6 cuts present on the baguettes.

Table 10b showing the evolution of the bread volume during storage at freezing temperature.

| | | Test n° | |
|---|---|---|---|
| Storage period | | 1 | 2 |
| Day 0 | Bread volume (%) | 100 | 100 |
| 7 days | Bread volume (%) | 98 | 98 |
| 90 days | Bread volume (%) | 97 | 96 | all volumes expressed in %: 100% corresponds for each test to the volume of bread obtained by baking frozen doughs directly after the freezing step The results show that there are no significant differences between the two processes. Therefore it is shown that the flattening process does not have a significant influence on the final result of the product after baking. Also there is no significant influence of the flattening process on the evolution of the bread volume.

Example 3

Fully Fermented Frozen Doughs

Baguette doughs are made with flour, salt, fermentation agent or fresh or instant active dry yeast (IADY) and/or dry sourdough and improver and water. The proportions of the different ingredients used in the tests are summarised in Table 11.

TABLE 11

| Component (in g) | recipe 1 | recipe 2 | recipe 3 | recipe 4 | Recipe 5 |
|---|---|---|---|---|---|
| Flour (DUO, Céres, Belgium) | 100 | 100 | 100 | 100 | 100 |
| Salt | 2 | 2 | 2 | 2 | 2 |
| O-tentic (Puratos, Belgium) | 4 | 4 | 0 | 0 | 4 |
| Fresh yeast | 0 | 0 | 2.6 | 0 | |
| IADY | 0 | 0 | 0 | 0.8 | 0 |
| Sourdough (Traviata, Puratos, Belgium) | 0 | 0 | 3 | 3 | 0 |
| Improver (S500 controller - Puratos - Belgium) | 0 | 2 | 2 | 2 | 0 |
| Improver (Quick Step Crispy, Puratos- Belgium) | 0 | 0 | 0 | 0 | 3 |
| Water | 60 + 8 | 60 + 8 | 60 + 6 | 60 + 8 | 60 + 8 |

S500 controller is a bread improver containing dextrose, emulsifier, gums ascorbic acid and enzymes.

Quick step crispy is a bread improver containing dextrose, emulsifier, gums, malt flour, gluten, ascorbic acid and enzymes Ingredients and doughs are processed as described in Table 12.

TABLE 12

| | Method |
|---|---|
| Kneading | 6 minutes slow |
| | 4 minutes fast with water 1 |
| | 2 minutes fast with water 2 |
| Dough temperature | 30° C. |
| Bulkproof | 30 minutes |
| Scaling | Breads 500 grams |
| Forming | Rounding and preshaping (stretching) |
| Intermediate fermentation | 20 minutes |
| Moulding | Putting tension inside dough |
| Final fermentation | 50 minutes at 28° C. |
| Blast freezing | 45 minutes at −30° C. |

Different final doughs are obtained using the recipes of table 11 and eventual additional process steps described in table 13.

TABLE 13

| | test | | | | | |
|---|---|---|---|---|---|---|
| | A | B | C | D | E | F |
| recipe (table 11) | 1 | 2 | 2 | 5 | 4 | 3 |

TABLE 13-continued

| | test | | | | | |
|---|---|---|---|---|---|---|
| | A | B | C | D | E | F |
| Additional process step | flattening | | flattening | flattening | flattening | flattening |

Flattening is made by passing the dough through a croissant dough laminating machine. Height of the doughs is reduced by about 50%.

After a defined freezing period, bakery products are taken out of the freezer and treated following the process described in Table 14.

TABLE 14

| Method | |
|---|---|
| Partial thawing | 30 minutes at room temperature |
| Cutting | 6 cuts a bread |
| Oven pre steaming | 3 seconds |
| Baking | 2 minutes 230° C./steam 1 second |
| | 19 minutes 200° C. |
| | 5 minutes 200° C. key opened |

The results of the comparative tests are summarized in Tables 15a and 15b.

TABLE 15a

| Storage period | | Test n° | | | | | |
|---|---|---|---|---|---|---|---|
| | | A | B | C | D | E | F |
| 7 days | Cuts opening | 37 | 32 | 34 | 40 | 34 | 21 |
| 90 days | Cuts opening | 31 | 32 | 40 | 42 | 36 | 23 |
| 180 days | Cuts opening | ND | 27 | 36 | 39 | 32 | 17 |

ND: not done

"Cuts opening" refers to the width of the cuts in mm as measured on the upper crust of baguette. Each data is the average of the 6 cuts present on the baguettes.

Table 15b showing the evolution of the bread volume during storage at freezing temperature.

| Storage period | | Test n° | | | | | |
|---|---|---|---|---|---|---|---|
| | | A | B | C | D | E | F |
| 7 days | Bread volume (%) | 100 | 100 | 100 | 100 | 100 | 100 |
| 90 days | Bread volume (%) | 99 | 97 | 103 | 100 | 99 | 96 |
| 180 days | Bread volume (%) | ND | 94 | 99 | 93 | 92 | 94 | all volumes expressed in %: corresponds for each test to the volume of bread obtained by baking frozen doughs after 7 days storage.

Results show that the use of fresh yeast (test F) does not give a baguette with great crust openings and therefore the baguette has a poor quality. The better results are obtained when using IADY (test E) and O-tentic (test A) and the best results are obtained when using O-tentic together with an improver (test C) and Quick Step Crispy (test D). This example also shows that the flattening process does not have a significant influence on the final result of the product after baking. The cuts opening after 180 days storage still is larger than the cuts opening obtained in a baguette made with fresh yeast.

Additionally the results show that the evolution of the bread volume during storage does not change significantly and therefore the process of the present invention does not alter the general parameters of the breads.

Example 4

Fully Fermented Frozen Doughs

Baguette doughs are made with flour, salt, fermentation agent or fresh or instant active dry yeast (IADY) contained in O-tentic or active dry yeast (ADY) and improver and water. The proportions of the different ingredients used in the tests are summarised in Table 16. Same amount of yeast dry matter has been added in the different recipes.

TABLE 16

| Component (in g) | recipe 1 | recipe 2 | recipe 3 |
|---|---|---|---|
| Flour (DUO, Céres, Belgium) | 100 | 100 | 100 |
| Salt | 2 | 2 | 2 |
| O-tentic (Puratos, Belgium) | 4 | 0 | 0 |
| Fresh yeast (Levante, Puratos, Belgium) | 0 | 2.6 | 0 |
| ADY (Active Dry Yeast) (Pakmaya, Turkey) | 0 | 0 | 0.8 |
| Improver (Quick Step Crispy, Puratos-Belgium) | 3 | 3 | 3 |
| Water | 60 + 8 | 60 + 6 | 60 + 8 |

Quick step crispy is a bread improver containing dextrose, emulsifier, gums, malt flour, gluten, ascorbic acid and enzymes Ingredients and doughs are processed as described in Table 17.

TABLE 17

| Method | |
|---|---|
| Kneading | 6 minutes slow |
| | 4 minutes fast with water 1 |
| | 2 minutes fast with water 2 |
| Dough temperature | 30° C. |
| Bulkproof | 30 minutes |
| Scaling | Baguettes 550 grams |
| Forming | Rounding and preshaping (stretching) |
| Intermediate fermentation | 20 minutes |
| Moulding | Putting tension inside dough |
| Final fermentation | 50 minutes at 28° C. |
| Blast freezing | 45 minutes at −30° C. |

Different final doughs are obtained using the recipes of table 16 and eventual additional process steps as described in table 18.

TABLE 18

| | test | | | | | |
|---|---|---|---|---|---|---|
| | A | B | C | D | E | F |
| recipe (table 16) | 1 | 1 | 2 | 2 | 3 | 3 |
| Additional process step | | flattening | | flattening | | flattening |

Flattening is made by passing the dough through a croissant dough laminating machine. Height of the doughs is reduced by about 50%.

After a defined freezing period, bakery products are taken out of the freezer and treated following the process described in Table 19.

TABLE 19

| | Method |
|---|---|
| Partial thawing | 30 minutes at room temperature |
| Cutting | 6 cuts a bread |
| Oven pre steaming | 3 seconds |
| Baking (Miwe oven) | 2 minutes 230° C./steam 1 second |
| | 19 minutes 200° C. |
| | 5 minutes 200° C. key opened |

The results of the comparative tests are summarized in Table 20.

TABLE 20

| Storage period | | A | B | C | D | E | F |
|---|---|---|---|---|---|---|---|
| | | | | Test n° | | | |
| Day 0 | Volume (%) | 100 | 100 | 100 | 100 | 100 | 100 |
| 14 days | Volume (%) | 96 | 94 | 93 | 98 | 95 | 88 |

"Volume (%)" refers to the average volume of a baguette compared to the volume of the same recipe at day 0 (i.e. baked directly after the freezing step). Each data is the average of the 3 measurements.

The results show that the process of the invention does not change the general parameters of the baguettes, comparing volume of baguettes made with O-tentic or fresh yeast. The baguettes made with ADY show less volume after freezing period and flattening process than the baguettes made with O-tentic or fresh yeast.

Example 5

Fully Fermented Frozen Doughs

Ciabatta doughs are made with flour, salt, fermentation agent or fresh or instant active dry yeast (IADY) contained in O-tentic or active dry yeast (ADY) and improver and water. The proportions of the different ingredients used in the tests are summarised in Table 21. Same amount of yeast dry matter has been added in the different recipes.

TABLE 21

| Component (in g) | recipe 1 | recipe 2 | recipe 3 |
|---|---|---|---|
| Flour (DUO, Céres, Belgium) | 100 | 100 | 100 |
| Salt | 2 | 2 | 2 |
| O-tentic (Puratos, Belgium) | 4 | 0 | 0 |
| Fresh yeast (Levante, Puratos, Belgium) | 0 | 2.6 | 0 |
| ADY (Active Dry Yeast) (Pakmaya, Turkey) | 0 | 0 | 0.8 |
| Improver (Quick Step Crispy, Puratos-Belgium) | 3 | 3 | 3 |
| Water | 60 + 8 | 60 + 6 | 60 + 8 |

Quick step crispy is a bread improver containing dextrose, emulsifier, gums, malt flour, gluten, ascorbic acid and enzymes Ingredients and doughs are processed as described in Table 22.

TABLE 22

| | Method |
|---|---|
| Kneading | 6 minutes slow |
| | 4 minutes fast with water 1 |
| | 2 minutes fast with water 2 |

TABLE 22-continued

| | Method |
|---|---|
| Dough temperature | 30° C. |
| Bulkproof | 30 minutes |
| Scaling | Ciabattas 550 grams |
| Forming | Rounding and preshaping (stretching) |
| Intermediate fermentation | 20 minutes |
| Moulding | Putting tension inside dough |
| Final fermentation | 50 minutes at 28° C. |
| Blast freezing | 45 minutes at −30° C. |

Different final doughs are obtained using the recipes of table 21 and eventual additional process steps as described in table 23.

TABLE 23

| | A | B | C | D | E | F |
|---|---|---|---|---|---|---|
| | | | test | | | |
| recipe (table 21) | 1 | 1 | 2 | 2 | 3 | 3 |
| Additional process step | | flattening | | flattening | | flattening |

Flattening is made by passing the dough through a croissant dough laminating machine. Height of the doughs is reduced by about 50%.

After a defined freezing period, bakery products are taken out of the freezer and treated following the process described in Table 24.

TABLE 24

| | Method |
|---|---|
| Partial thawing | 30 minutes at room temperature |
| Cutting | 6 cuts a bread |
| Oven pre steaming | 3 seconds |
| Baking (Miwe oven) | 2 minutes 230° C./steam 1 second |
| | 19 minutes 200° C. |
| | 5 minutes 200° C. key opened |

The results of the comparative tests are summarized in Table 25.

TABLE 25

| Storage period | | A | B | C | D | E | F |
|---|---|---|---|---|---|---|---|
| | | | | Test n° | | | |
| Day 0 | Volume (%) | 100 | 100 | 100 | 100 | 100 | 100 |
| 14 days | Volume (%) | 94 | 94 | 92 | 91 | 88 | 87 |

"Volume (%)" refers to the average volume of a ciabatta compared to the volume of the same recipe at day 0 (i.e. baked directly after the freezing step). Each data is the average of the 3 measurements.

Results show that the process of the invention does not change the general parameters of the ciabattas, comparing volume of ciabattas made with O-tentic or fresh yeast. The ciabattas made with ADY show less volume after freezing period than the ciabattas made with O-tentic or fresh yeast.

The invention claimed is:

1. A method for producing a fully fermented frozen dough, chosen from bread, roll, baguette, soft roll, bagel, hamburger roll, ciabatta and rusk, said method comprising:
    (a) preparing a dough by mixing at least flour, water and Instant Active Dry Yeast;

(b) kneading and moulding said dough;
(c) proofing said dough until complete proofing has been achieved,
(d) flattening said dough; and
(e) freezing said dough,
wherein the flattening step is performed after said proofing step and prior to said freezing step; wherein said flattening step comprises reducing the thickness of the dough by about 50%; and wherein said dough does not comprise additives selected from the group consisting of chemical leavening agents and ethanol.

2. The method according to claim 1, wherein said Instant Active Dry Yeast is added to the mix without prior processing.

3. The method of claim 1, wherein the fully fermented frozen dough additionally contains a flavor improvement composition comprising a sourdough product, a sponge product, or a mixture thereof.

4. The method of claim 1, wherein the fully fermented frozen dough further comprises at least one acidifying agent.

5. The method of claim 1, wherein the fully fermented frozen dough additionally contains an improver composition comprising:
(i) one or more enzymes selected from the group consisting of amylases, xylanases, lipases, oxidases, lipoxigenases and proteases,
(ii) one or more oxidizing or reducing agents,
(iii) one or more emulsifiers,
(iv) one or more fatty materials,
(v) one or more vitamins,
(vi) one or more gums,
(vii) one or more sources of fibre, or
(viii) a mixture of two or more thereof.

6. The method of claim 1, wherein said Instant Active Dry Yeast is present in an active bakery component based on sourdough.

7. The method according to claim 1 wherein said Instant Active Dry Yeast is present at a concentration of 0.5 to 2% based on the flour weight.

8. The method according to claim 1 wherein said flattening step comprises rolling out or compressing the dough.

9. The method according to claim 7 wherein said method does not comprise the addition of gluten.

10. The method according to claim 1 wherein said fully fermented frozen dough is a baguette or ciabatta.

11. A method for producing a bakery product chosen from bread, roll, baguette, soft roll, bagel, hamburger roll, ciabatta and rusk, said method comprising:
(a) preparing a dough by mixing at least flour, water and Instant Active Dry Yeast;
(b) kneading and moulding said dough;
(c) proofing said dough until complete proofing has been achieved;
(d) flattening said dough;
(e) freezing said dough;
(f) thawing said frozen dough; and
(g) baking said thawed dough;
wherein the flattening step is performed after said proofing step and prior to said freezing step; wherein said flattening step comprises reducing the thickness of the dough by about 50%; and wherein said bread dough does not comprise additives selected from the group consisting of chemical leavening agents and ethanol.

12. The method of claim 11, wherein said fully fermented frozen dough is partially thawed prior to baking.

13. A method according to claim 11 or 12, further comprising the step of incising said fully fermented frozen dough at its top surface prior to baking.

14. The method according to claim 11 wherein said bakery product is a baguette or ciabatta.

\* \* \* \* \*